Sept. 2, 1969   W. D. DOWNING ET AL   3,464,542
FEEDING STRIPS FOR FASTENER-ACCEPTING INSERTS AND METHOD
Filed Dec. 28, 1967
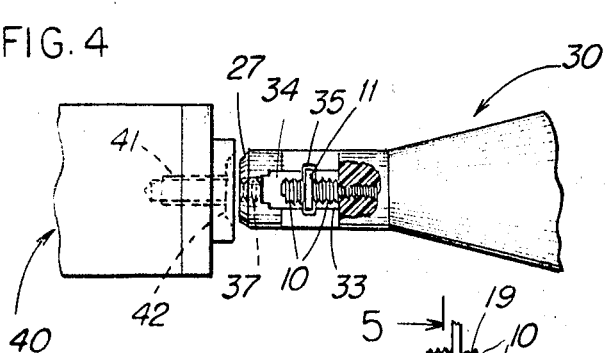
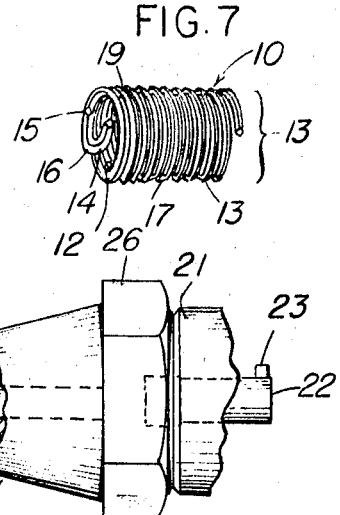
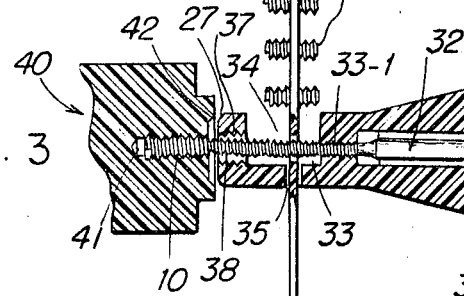
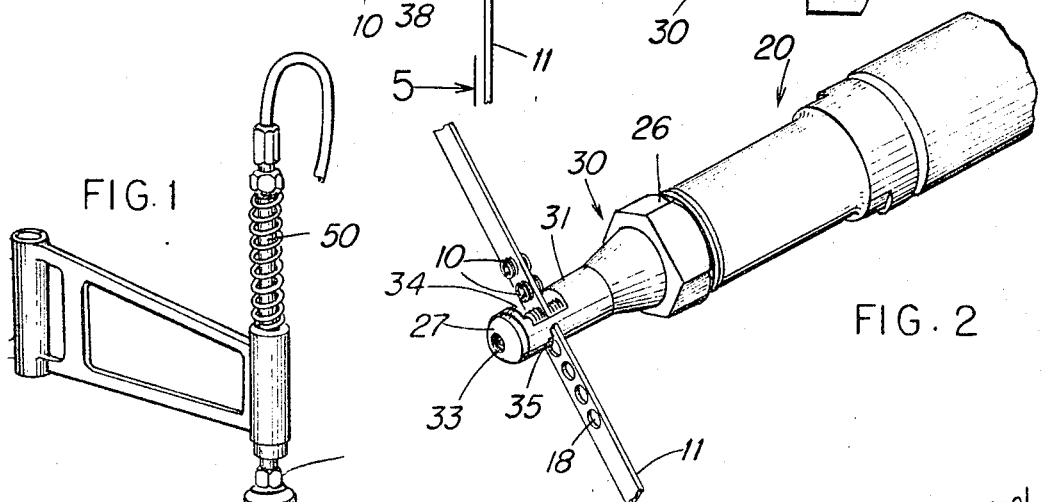
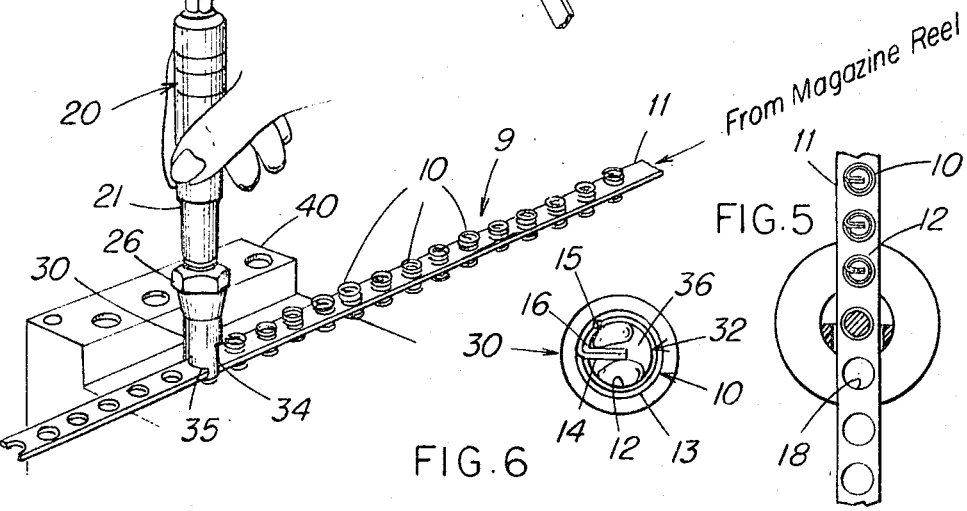

United States Patent Office 3,464,542
Patented Sept. 2, 1969

3,464,542
FEEDING STRIPS FOR FASTENER-ACCEPTING INSERTS AND METHOD
William D. Downing, Newtown, and Jean Remond, Danbury, Conn., assignors to Heli-Coil Corporation, Danbury, Conn., a corporation of Delaware
Filed Dec. 28, 1967, Ser. No. 694,178
Int. Cl. B65d 83/04; B23p 19/04
U.S. Cl. 206—56                     5 Claims

ABSTRACT OF THE DISCLOSURE

Flexible polymeric strips are provided for successive feeding of threaded inserts to installation tools. The inserts are held in place in the strips by an interference fit within aperture in the strip. The material for the strips has controlled physical properties which dissipate the distortions arising from the dislocation stresses of the interference fit. The controlled physical properties are tensile strength, elongation, and hardness. Also provided is a method for the orientation of the inserts by alignment means guiding the strips within the installation tools.

The invention field and prior art

The present invention relates to threaded inserts, such as wire coil inserts and the like, used as thread lining for tapped and untapped cavities or holes in workpieces, and more particularly relates to means for feeding such inserts to installing tools for installing such inserts into their intended cavities.

Such inserts in one form are commonly made by helically coiling wire of diamond-shaped cross-section and are provided with a diametrical tang in continuation of the head turn or end convulution to be engaged by the tool for rotary insertion of the coil.

Conventionally, to provide a secure fit of the inserts into the receiving cavities, tapped or untapped, such inserts of coil form are produced by coiling the wire to an outside diameter larger than the diameter of the receiving cavity or hole. In order to install the insert into the hole in the workpiece, prewinding or contraction of the insert before and during the insertion operation is desirable. Upon seating of the insert where desired, the tool is disengaged, the contraction forces are thereby relaxed and the expanded coil engages the sides of the hole in an interference fit.

Tools have been designed for installing these inserts. Conventionally each includes a mandrel having its lead end designed to be telescoped into such an insert and shaped to engage the tang of the head turn of the insert for application of driving torque to the insert. Such a tool may have the lead end of its mandrel threaded to engage with the internal insert thread and be provided with an intermediate thread portion, and includes an internally threaded prewinder section in the form of a feed sleeve having an insert accepting breech surrounding the mandrel intermediate its ends, such as that disclosed in United States Patent 2,584,118.

The wire coil insert is placed within the breech portion of the sleeve with its tang end directed toward the workpiece. The lead end of the mandrel is inserted into the insert to engage the tang of the latter and, upon application of torque to the mandrel, the insert is threadably advanced in the sleeve and constricted around the mandrel thereby reducing its outer diameter. It can then freely enter into the cavity or hole in the workpiece. Upon seating at the desired depth in the cavity, the application of torque via the tool is discontinued and the insert expands to engage the sides of the cavity. The disengaged tool is then withdrawn.

Variations in specific insert design with regard to engaging mechanisms and other features have been described. Modified tools for inserting these inserts into various workpieces have similarly been described and are the subject of United States Patents, such as 3,093,895 and 3,111,751.

While the helically coiled wire inserts are most commonly used, inserts may also take the form of cast or machined solids from metal or polymers and are provided with internal engaging means for fasteners such as screws and external engaging means for gripping the sides of the cavity in the workpiece.

Each wire coil insert must be individually fed into the breech of the inserting tool with its tang properly leading and its axis aligned with that of the tool mandrel. Serious problems of proper insert orientation and alignment in the tool sleeve breech arise when the inserts are of small diameter and are short, especially in the case of automated, high speed operation where rapid feeding of the inserts to the inserting tool breech for speedy successive installation is desired.

It has been proposed to position the inserts in a successive spaced array and to constrain them in position between two tapes of polymeric material that are sealed together between the inserts, or by interference fitting them into holes punched into flexible polymer strips, to provide insert feeding means for automated tools. Such composite strips are then fed via alignment guides into the breech of the prewinder section of the inserting tool to deliver the inserts to the mandrel ready for the installing operation.

Often such strips do not possess sufficient dimensional stability to deliver the insert in proper alignment with respect to the mandrel. If the strip material is too hard, it may cause distortion of the inserts by changing the free diameter of the insert at those turns where the hard polymer compresses the wire to interfere with the insertion of the mandrel lead end thereinto.

Other defects noted in prior strip-feed arrangements are cocking of the inserts when the axis of the insert is not perpendicular to the surface of the strip. Such cocking may damage the tangs of the inserts, causing improper functioning of the driving tool, and misalignment of the inserts with respect to the receiving cavities or threaded holes.

Misalignment and malpositioning of the inserts most often results from distortion of the polymer strip by the dislocation stresses in the strip caused by the interference fit. Such deformations of the loaded feeding strip prevent a constant and smooth progression of succeeding inserts into the breech of the inserting tool and also prevent proper alignment of the inserts in the breech of the tool with respect to the inserting mandrel. These distortions, which are due to "elastic the memory" of flexible polymers, remain after the unloading of the insert from the strip and prevent a smooth flow of the strip through guiding portals in the tool. These portals admit the strip-carried inserts to the bore of the tool feed sleeve and the exit of the unloaded strip.

It is an object of this invention to provide an insert-feeding strip with characteristics and properties that obviate the shortcomings of previously used strip material.

It is also another object of this invention to provide insert-feeding strips that have maximum dimensional stabiltiy with respect to the inserts carried thereby and with respect to alignment guides in the installing tool.

Summary of invention

The above and further objects are realized by the use of an insert carrying strip means made from a flexible polymer having a relationship of hardness and elongation and tensile strength that result in the dissipation within the body of the strip of the dislocation stresses caused by the interference fit. Such a relationship of physical properties includes control of the tensile strength, elongation and hardness within certain preferred limits. For example with polyethylene, a preferred material, the tensile strength should range from 1,680 to 1,750 p.s.i.; the elongation should range from 400 to 415%; and the hardness (Durometer Short D) should range from 45 to 50. In addition, in order to insure continuance of these properties within normal temperature operating ranges, it is desirable that the polyethylene polymer should have a resistance to continuous heat of 180° F. minimum and a low temperature brittleness limit down to about −80° C.

This strip is rectangular in cross-section and preferably is produced by extrusion. In certain forms designed for particular services it may be about 0.055 inch thick, and in width from about 0.250 to about 0.362 inch. The sizes of the longitudinally-spaced holes centrally punched therein for reception of the wire coil inserts may be about 0.133 to about 0.153 inch in diameter for the strip width of 0.250 inch; about 0.167 to 0.177 inch in diameter for the strip width of 0.312 inch; and about 0.187 to about 0.242 inch in diameter for the strip width of 0.362 inch. The thickness set forth provides at least one turn of thread of the insert in interference fit with the strip. With other thickness of the strip similar proportions have been satisfactory as long as at least one turn of the thread is engaged by the strip.

Details of the advantages of this invention with respect to polymer strips for positioning inserts within installation tools will further be apparent from the accompanying drawing wherein like numerals identify similar parts throughout.

The drawing

FIG. 1 is a perspective view of a suitable tool assembly fixture to which is progressively fed a feeding strip of the present invention, illustrating the successive installation therefrom of small wire coil inserts;

FIG. 2 is another perspective view to larger scale, with parts broken away, of the installing tool shown in FIG. 1, illustrating progressive feed of the strip through the tool bore via the breech portal and the exit portal;

FIG. 3 is a side elevational view to still larger scale, with parts broken away and in section, showing the mandrel seating an insert into a receiving hole in a sectioned workpiece;

FIG. 4 is a side elevational view, with parts broken away and in section, of the structure shown in FIG. 3, taken at right angles to the plane of view of FIG. 3, and illustrating entry of the leading end of the mandrel into a succeeding strip-carried insert preparatory to installation thereof;

FIG. 5 is an enlarged sectional view taken on line 5—5 of FIG. 3;

FIG. 6 is an enlarged end view of the tool structure of FIG. 2, illustrating the engagement of the leading end of the mandrel into an insert; and FIG. 7 is an enlarged perspective view of a helically coiled wire insert fashioned from diamond-shaped wire of the type shown in other figures of the drawing.

As is common knowledge in the art, a threaded insert 10 of the conventional type consists of wire 17 of generally rhomboidal and preferably diamond-shaped cross-section coiled into a helix. As a result of the coiling of the diamond-shaped wire, the helix has successive turns providing inner and outer screw thread crests 12 and 13 (FIG. 7). The outer thread crests are intervened by thread roots 19 which intervene the successive wire turns. Head turn 16 of the helical insert 10 is shaped to provide at its leading end a chordal and preferably diametrical tang 14 having a rounded root corner that provides a lead-in which facilitates entry into the receiving hole 41 in the workpiece 40 (which may be internally threaded, or unthreaded if of softer material such as plastic). The head turn 16 is preferably provided with a cross-notch 15 to facilitate breaking off of the tang 14 after the insert has been seated in the workpiece hole 41.

A plurality of inserts 10 are forced or screwed into successive apertures 18 formed in feeding strip 11 of this invention by an interference fit wherein the inside diameter of these apertures is smaller than the outside diameter of the outside thread crests 13 of the inserts.

An installing tool assembly 20 includes a prewinder installation section 30 to which is connected a suitable source of air. 50 is a tube to guide the tool when used with the toolholder (no number). Air passes through tube 50 into the air motor of the tool 20 for driving a rotary mandrel in this section. The tool assembly 20 is designed to be selectively fitted with different prewinder installing sections for seating threaded inserts of different sizes designed threadably to receive screws of different dimensions.

The tool assembly 20 also includes an adapter housing 21 within which is housed the outer end 22 of the driving mandrel 32. The outer end 22 of the driving mandrel 32 is provided with a key 23 through which torque is transmitted from the tool assembly 20. As is hereinafter indicated the mandrel of any particular prewinder section 30 is made integral with shaft 22 for drive thereby. Thus the mandrel 32, mandrel end 22 and key 23 form part of the replaceable prewinder section 30. The prewinder section 30 is removably mounted to the adapter shell 21 by a retaining nut 26.

The prewinder section 30 embodies a prewinder sleeve 31 having a through bore 33 in which is rotatably mounted externally threaded mandrel 32 that has threaded engagement with a section of the bore at 33–1 for axial translation as the mandrel is rotated by shaft 22. Prewinder sleeve 31 has a pair of portals respectively located on opposite sides of the sleeve bore 33. One of these portals is provided by a side opening 34 which serves as a loading breech through which enters the feeding strip assembly 9 (consisting of the plurality of inserts 10 carried by feeding strip 11). The other portal 35 which is diametrically opposed to the loading breech 34 is in the form of a rectangular slot which serves as an exit for the unloaded strip 11. Exit portal 35 is dimensionally mated closely to the dimensions of the strip 11 to serve as means for aligning each insert with the installation mandrel 32.

The forward end or tip of mandrel 32 is provided with torque-applying means 36 for engaging the insert tang 14 rotatably to drive the insert 10. For this purpose it may be provided with a cross slot into which the tang 14 will engage for rotary drive. The forward section 38 of the threaded mandrel is smaller in diameter than the insert so that the oversized insert may contract around it upon application of torque to the insert with drag imposed on its turns. The forward section 37 of the sleeve bore 33, beyond the loading breech 34 is threaded to contract each insert 10 around the threaded mandrel section 38 while progressively advancing the insert therethrough to reduce the outer diameter thereof for ready entry into the cavity 41 of the workpiece 40. The nose 27 of the prewinder sleeve 31 may be conically shaped for ready seating into a countersunk area 42 surrounding the mouth of the receptive hole 41 in order to facilitate proper alignment of the tool assembly 20 therewith.

The preloading feeding strip assembly 9 may be reeled up into a roll within a supply magazine (not shown). With the mandrel tip 36 retracted preloaded feeding strip assembly 9 is threaded through loading breech 34, across the bore 33 and thence through the exit portal 35 for alignment of the first of the inserts 10 carried thereby with the mandrel tip and the contracting bore section 37.

Upon rotatable drive with axial advance of mandrel 32 its front end section 38 freely enters the insert 10 to effect engagement of the insert tang 14 by the tang-engaging portion 36 of the mandrel. Upon application of torque to this insert 10 by the driven mandrel the insert is advanced through the feeding strip 11 into and through the forward sleeve section 37 for contraction and ready entry into the receptive hole or cavity 41.

The mandrel 32 is then reversely rotated to withdraw its front end section 38 from the seated insert and the unloaded hole in the feeding strip 11 to retract its tip 36 back beyond the rear end of the next strip-carried insert 10. The unloaded portion of the strip is then advanced through exit portal 35 to move the next strip-carried insert 10 through breech 34 into alignment with the retracted mandrel for a repetition of the installation operation. It is to be noted that the sleeve bore 33 at the breech 34 is of such dimension that the back side thereof serves as a stop for this next insert that automatically assures axial alignment thereof with the mandrel.

The flexible insert-feeding strip of this invention is fabricated from any flexible polymer whose physical properties are modified so that the relationship of hardness, elongation and tensile strength result in a material which when fabricated into a flexible strip can dissipate within the body of the strip the dislocation stresses caused by the interference fit that holds the inserts in the strip without undue bulging of the strip edges located to opposite sides of each hole in which an insert is carried.

Among the suitable polymers which may be modified by physical and chemical means to provide the strips of this invention are the polyolefins; including polyethylene, polypropylene; synthetic rubbers, including the butadienes; the polyamides including various nylons; the polyesters including polyethylene terephthalate; and blends thereof with each other and with modifying chemicals.

The chemical modification of these polymers may be accomplished by such reactions as vulcanization or by the addition of chemicals to plasticize, to control a chain length, to control crystallinity, to control cross-linking, and to control internal slippage of the polymer.

Physical modification of these polymers includes the initiation of cross-linking by radiation sources such as radioactive isotopes or by bombardment with atomic particles in high energy accelerators.

Preferred among the material for the purpose of this invention are the polyolefins and the polyamides with polyethylene as the material of choice. Generally the polyethylenes, as well as the other materials mentioned above, have a wide range of physical properties. Many polyethylenes will not meet the criteria for dissiptating within the body of the strip the deformation resulting from the dislocation stresses.

By proper plasticization and/or radiation procedures, the physical properties of these materials, generally and specifically of polyethylene, may be modified so that the criteria of this invention are met. In polyethylene the combination of hardness (Durometer Shore D) range from 45–50; ultimate elongation range of about 400–415%; and tensile strength range 1680–1750 p.s.i., provides a completely satisfactory material fulfilling the criteria of this invention. Modification of the polymers to yield polymers for feeding strips having the general criteria set forth for this invention are within the skill of chemists in the polymer field when provided with the proper characteristics.

This invention in another of its aspects goes beyond the provision of a feeding strip for the inserts and includes within its ambit the composite of feeding strip means with inserts perpendicularly mounted therein by interference fit. The composite of this aspect of the invention demands that the flexible polymer strip be substantially free from external deformations adjacent to the areas in contact with the insert. Such external deformations, that may be evidenced by bulging, commonly result from interference fits in flexible materials. Moreover, the composite insert-feeding strips of the present invention are particularly useful as they permit the feeding of the loaded strip into installation tools provided with dimensionally-mated alignment guides either or both in the entering or loading breech and in the exit portal of the tool. Such cooperation of the strip with the guide means ensure the proper positioning of the insert within the tool with respect to the installation mandrel. The strip must be thinner than the length of the insert. Otherwise the insert will not align itself on the back side of the breech 34 as discussed previously. Such small inserts because of their minuscule size have very small alignment tolerances. By using both the entering and exit portals as alignment guides, critical alignment tolerances can easily be met. Previously, loaded composite feeding strips could not and did not dissipate the interference fit distortions and these distortions caused aberations in fit and alignment when the feeding strip served as the alignment and indexing means for the insert. The prior composite feeding strips, because of the distortions, could not provide the accuracy of alignment afforded by the novel composite loaded feeding strips of this invention.

The insert may also be aligned by guiding means within the bore of the installation tool to ensure a positive positioning with respect to the mandrel. Such guiding means include stops, grooves, notches and similar guiding elements for engaging the ends of the inserts which protrude from the strip. Even the wall of the bore can serve as a guide and stop means for the insert. With previous feeding strip means not according to this invention the deformations of the polymer prevented proper contact of the insert with the guide and also prevented dimensioinal mating of the strip with regard to the portals. The deformations also prevented positive seating of the insert against the guiding means with respect to the mandrel.

It is to be understood that this invention, while it is directed particularly to inserts fabricated from wire of diamond-shape cross-section is similarly applicable to helical coils of wire of any other cross-sectional shape and moreover is not restricted with regard to inserts of wire coils. Inserts may be fabricated from metals or plastics by casting, molding, machining and similar operations known to the art to provide fastening-accepting devices which are adapted for insertion into workpieces and which provide attachment means for various types of fasteners, including friction fasteners, screws, nails and the like. Moreover, the external surfaces of the inserts are not limited to screw thread formation but knurls, ridges, springed projections and similar surface-extending and friction-providing external surfaces are included.

With respect to the embodiments of this invention as illustrated and described, it is to be understood that each of the individual embodiments is a preferred one, since each has its own advantages for the specific purpose for which it is intended. Further, where specific terminology is utilized or specific materials are mentioned, it is understood that the invention is not restricted to such terms or materials but that all useful and conventional equivalents of such terms and materials meeting the criteria of this invention are intended and included thereby.

What we claim is:

1. A feeding strip carrying a plurality of perpendicularly oriented tubular fastener-accepting inserts of generally round cross-section, in the form of a helical coil, to be used for facilitating the supply and installation of said inserts, which comprises a flat strip of semirigid polymeric material that is of substantially uniform thickness and rectangular in cross-section and having top and bottom faces and opposite substantially parallel straight side edges, said strip being provided along its central longitudinal axis with a series of longitudinally-spaced apertures that are substantially perpendicular to its faces, and a plurality of said inserts with one thereof being mounted in each of the apertures with interference-fit, said polymeric material having a relationship of hardness, elongation and tensile strength that result in the dissipation within the body of the strip of the dislocation stresses caused by the interference-fit reception of said inserts with the side edges of said strip being free of any appreciable bulging opposite said mounted inserts.

2. The feeding strip according to claim 1 wherein the flexible polymer is chosen from the class of polyolefins, polyamides and polyesters.

3. The feed strip according to claim 2 wherein the polymer is polyethylene.

4. The feeding strip according to claim 3 wherein the polyethylene has a tensile strength range of 1680 to 1750 p.s.i., with an ultimate elongation of 400–415% and a Durometer (Shore D) of 45 to 50.

5. A feeding strip carrying a plurality of perpendicularly oriented tubular fastener-accepting inserts of generally round cross-section, in the form of helical coils of wire that is rhomboidal in cross-section, to be used for facilitating the supply and installation of said inserts, which comprises a flat strip of semirigid polymeric material that is of substantially uniform thickness and rectangular in cross-section and having top and bottom faces and opposite substantially parallel straight side edges, said strip being provided along its central longitudinal axis with a series of longitudinally-spaced apertures that are substantially perpendicular to its faces, and a plurality of said inserts with one thereof being mounted in each of the apertures with interference-fit, said polymeric material having a relationship of hardness, elongation and tensile strength that result in the dissipation within the body of the strip of the dislocation stresses caused by the interference-fit reception of said inserts with the side edges of said strip being free of any appreciable bulging opposite said mounted inserts.

References Cited

UNITED STATES PATENTS

| | | | |
|---|---|---|---|
| 3,095,677 | 7/1963 | Dreyfus et al. | 206—56 X |
| 3,097,360 | 7/1963 | Carlson et al. | 206—56 |
| 2,672,070 | 3/1954 | Forster. | |
| 2,780,265 | 2/1957 | Brancato | 29—456 X |

JOSEPH R. LECLAIR, Primary Examiner

J. M. CASKIE, Assistant Examiner

U.S. Cl. X.R.

29—456